United States Patent [19]

Milburn, Jr.

[11] Patent Number: 4,672,989

[45] Date of Patent: Jun. 16, 1987

[54] FLOW CONDITIONED NUTATION VALVING APPARATUS AND METHOD OF OPERATION

[75] Inventor: William W. Milburn, Jr., Boulder, Colo.

[73] Assignee: Milburn Research Corporation, Boulder, Colo.

[21] Appl. No.: 872,866

[22] Filed: Jun. 11, 1986

Related U.S. Application Data

[63] Continuation-in-part of Ser. No. 474,829, Mar. 14, 1983, Pat. No. 4,597,403.

[51] Int. Cl.[4] ...................... F02B 59/00; F16K 31/524

[52] U.S. Cl. .......................................... 137/1; 91/173; 92/177; 123/42; 123/47 R; 123/63; 137/625.2; 417/466; 418/61 R; 251/251

[58] Field of Search ............ 91/173; 92/177; 123/42, 123/45 R, 47 R, 50 R, 53 R, 61 R, 63; 137/1; 127/625.2; 251/251; 417/466; 418/61 R, 49, 52, 53, 186, 242

[56] References Cited

U.S. PATENT DOCUMENTS

| | | | |
|---|---|---|---|
| 1,734,433 | 11/1929 | Hoyt | 418/61 R |
| 1,972,302 | 9/1934 | Hutchison, Jr. | 418/186 |
| 3,511,584 | 5/1970 | Vierling | 418/61 R |
| 3,567,349 | 3/1971 | Meulendyk | 418/61 R |
| 3,703,344 | 11/1972 | Reitter | 418/61 R |
| 3,736,078 | 5/1973 | Read et al. | 418/61 R |
| 3,974,803 | 8/1976 | Lassota | 123/42 |
| 4,010,675 | 3/1977 | Lassota | 123/42 |
| 4,097,205 | 6/1978 | Miles | 418/61 R |
| 4,325,331 | 4/1982 | Erickson | 123/42 |
| 4,437,437 | 3/1984 | Erickson | 123/42 |

FOREIGN PATENT DOCUMENTS

| | | | |
|---|---|---|---|
| 474336 | 6/1972 | Australia | 418/61 R |

*Primary Examiner*—George L. Walton
*Attorney, Agent, or Firm*—Robert E. Harris

[57] ABSTRACT

Structure and method are disclosed for providing timed valving in which a nutating plate having an opening defined therethrough moves relative to at least one other nominally static plate having a complementary opening defined therethrough, the nutating plate at one portion of the nutating travel bringing the opening defined therethrough in alignment with the complementary static opening and in another portion of the nutating movement positioning such opening therethrough in a spaced, sealing relationship relative to the complementary static opening. Either the nutating or nominally static plate may be utilized in pairs such that a sandwiched relationship between one type of plate and the other exists. The walls of the opening in the static plate are angularly disposed with respect to the walls of the opening defined in the nutating plate and steadily converge in the direction toward the nutating plate thereby restricting the opening in the static plate at the face adjacent to the nutating plate, with the angular disposition and convergence being configured to reduce turbulent flow during opening and closing of the valving structure. Timing of the opening and closing of the valving structure may be adjusted relative to the drive shaft so as to provide opening and closing cycles of selected portions of an entire rotation.

19 Claims, 29 Drawing Figures

94
91
88

FLOW CONDITIONED NUTATION VALVING APPARATUS AND METHOD OF OPERATION

RELATED INVENTION

This application is a continuation-in-part of U.S. application Ser. No. 474,829, filed Mar. 14, 1983, and now pending, entitled "Nutation Valving Apparatus and Method of Operation", now U.S. Pat. No. 4,597,403.

FIELD OF THE INVENTION

This invention relates generally to valving mechanisms for operation and timed relationships to another moving structure, such as reciprocating or rotating pumps, compressor heat engines, etc., and more particularly to a nutating valving arrangement in which one plate member moves in nutating relationship to at least one other static plate member such that openings defined through each of the plate members come into alignment for selected portions of the nominal cycle, the openings being configured to minimize turbulent flow.

BACKGROUND OF THE INVENTION

Numerous valving arrangements for timed operation relative to, for instance, a rotating shaft are known. For purposes of convenience, discussion of such arrangements with reference to a reciprocating piston device will be addressed.

Perhaps the most common timed valve mechanism is a poppet valve in which a tulip valve reciprocates in timed relationship to rotation of a shaft, usually by a cam shaft driven by an associated crank shaft. Though widely accepted, the poppet valve suffers several problems. A reciprocating motion with accompanying acceleration forces limits speed of operation and at high speed tends to induce wear of the valve and seat. Also, even when opened, the poppet valve obstructs to a substantial extent the opening and thus restricts flow and causes turbulence, while sudden valve closure can result in additional wear and noise.

Another simpler valving arrangement is that of a piston timed port in which a simple opening is defined, for instance, in a cylinder wall in communication with a port such that a reciprocating piston in the cylinder will open and close the port as a piston travels thereby. In addition to wear problems resulting from the rapidly moving piston, or more often piston rings, travelling over the opening, such arrangement is inappropriate for use in the ubiquitous four stroke Otto-cycle engine in that the timing of such device usually causes a valve to open on the upstroke of the piston to remain open through a complete downstroke and somewhat into the following upstroke. Thus, a valving device that opens at a fixed position in each stroke is clearly inappropriate and inflexible.

Rotary valves in which, in the common instance, a fixed cylinder having an opening defined therethrough is contained in or contains a rotating cylinder having a complementary opening therethrough such that as the rotating cylinder passes through an aligned arrangement between the opening therein and the fixed cylinder opening flow occurs, has certain apparent advantages. Reciprocating parts are avoided. However, because of the extensive travel between various portions of the valving mechanism, wear and accordingly sealing shortcomings have often developed when such rotary valves are used. In a related arrangement, a disc rotating adjacent an opening again involves substantial surface to surface wear as the disc rotates through each valve cycle.

An unusual valving mechanism is described in U.S. Pat. No. 4,325,331 issued Apr. 20, 1982 to Frederick L. Erickson. As particularly well shown in FIGS. 30 through 32, a combination of edge surfaces of a reciprocating piston and orbiting piston are used to effect a variation of the above described piston timed port arrangement. Such configurations clearly are restricted to timing rate, duration and/or location of the parts.

U.S. Pat. Nos. 1,972,302 and 3,736,07B issued Sept. 4, 1934 to Hutchinson, Jr. and May 29, 1973 to Read et al., respectively, show the use of a rotating member adjacent a fixed member for bringing ports in the rotating and fixed members into and out of communication with one another. However, there is apparently no teaching of port means configured for conditioned flow through the device for reduction of turbulence, noise and/or wear due to impacts occasioned by sudden opening and closing of ports.

Numerous other valving arrangements have been proposed, but usually with the disadvantages or combinations of disadvantages discussed above resulting from reciprocating or rotary movement between the different valve components.

SUMMARY OF THE INVENTION

The present invention, which provides a heretofore unavailable advantage and utility in providing for timed valving cycles comprises a nutating movement between a minimum of two plate components each of which has an orifice defined therein. The orifices are aligned during one portion of the nutating movement and are positioned in a sealed, spaced relationship in another portion of the nutating movement. Further, the timing of the valving structure may be adjusted to permit design variations in timing, or if desired, a dynamic variation during operation. The orifices are configured and located for enhanced flow characteristics resulting in reduced flow turbulences, valve noise and wear thereby resulting in greater overall efficiency of the structure. Thus a simple and readily produced structure which permits straightforward, efficient and flexible valving is provided while avoiding the problems of reciprocating or rotating valving structures heretofore common.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figures 1, 2:
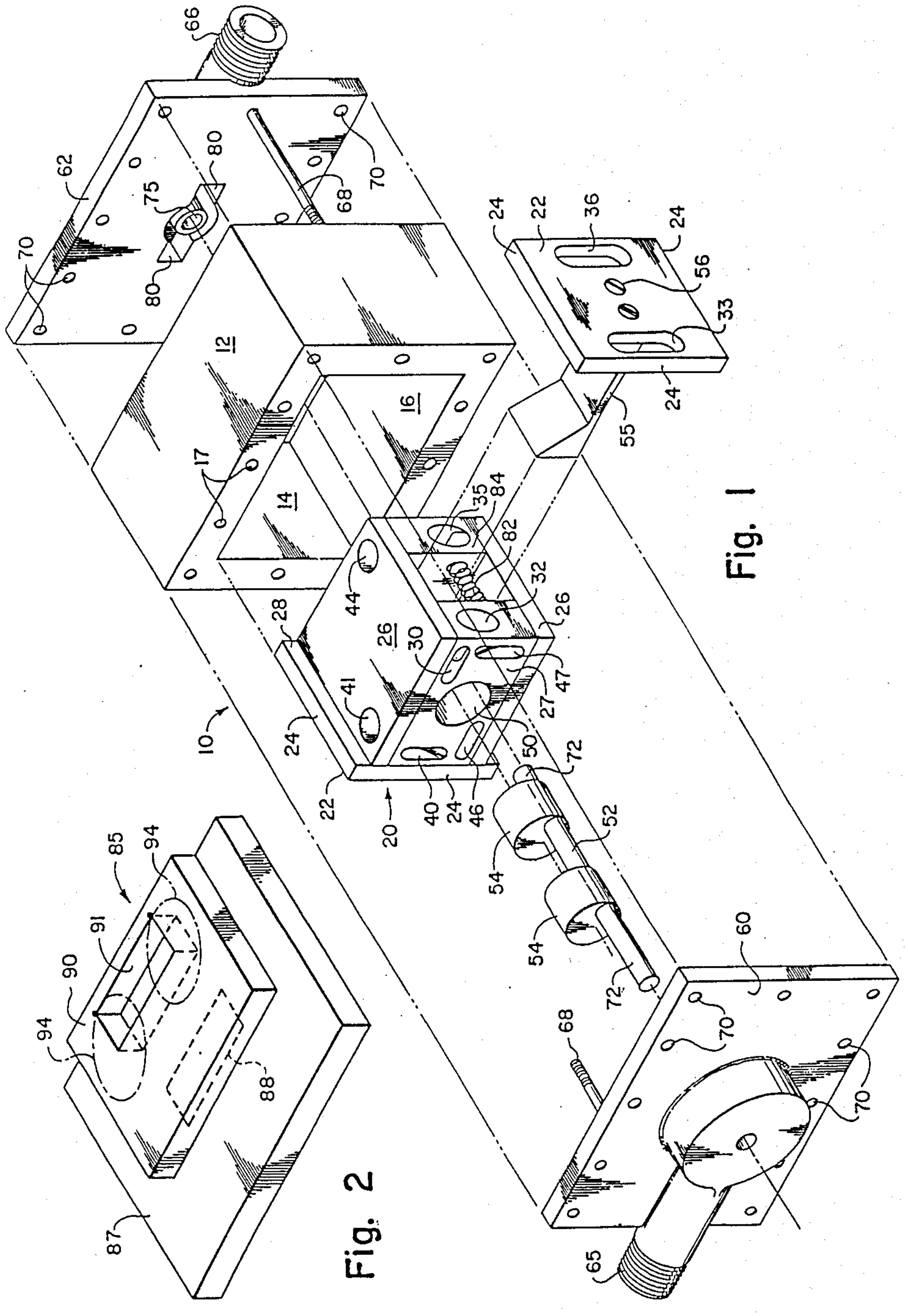
FIG. 1 is a perspective, exploded view of a pump device utilizing a nutating valving structure.
FIG. 2 is a simplified perspective view illustrating nutation motion.

Turning now to the drawings, where elements of similar structure or function are designated by like reference numerals throughout the various figures, a pump structure utilizing a nutation valving arrangement is illustrated in FIG. 1 and generally designated by the reference numeral 10. Pump 10, which is chosen only for purposes of illustration as advantageously embodying a nutating valving structure, includes central housing 12 having a rectilinear opening defined therethrough by opposed end walls 14 and top and bottom walls 16. A plurality of cylindrical openings 17 are defined therethrough. Piston assembly 20 is configured to fit within the opening defined in central housing 12.

It is to be understood that piston assembly 20, as well as the remainder of pump 10, includes symmetrical or mirror image structures such that illustration and description of the side and upper faces fully disclose and illustrate corresponding side and lower faces not shown in detail in the drawing. For instance, outer pistons 22 on opposed sides of piston assembly 20 are essentially identical though disposed in inverted relationship. Outer pistons 22 are adapted to reciprocate within the opening defined in central housing 12 with top and bottom faces 24 sealing against top and bottom wall 16 of central housing 12. Side faces 24 form a sealing relationship as will be described in more detail below.

Inner pistons 26, positioned at the top and bottom of piston assembly 20, have faces 27 extending therebetween, as indicated in FIG. 1, to form an inner piston structure, and are movably disposed within the inner surface 28 of outer piston 22 such that inner piston 26 reciprocates up and down within outer pistons 22 as will be described in more detail below.

Four intake and four exhaust ports and openings, each of which comprise a nutation valving assembly are illustrated. It will be understood that the particular structure of each of these arrangements is redundant in large part and accordingly only representative features will be described in detail. For instance, intake opening 30 communicates through intake port 32 with right side outer pistons 22 such that intake gases can flow through intake opening 30, to intake port 32 and into the varying volume defined by right outer piston 22 through elongated opening 33. Thus, as outer pistons 22, each of which have a similar structure, reciprocate in the opening defined at central housing 12, valve porting communicating with the varying volumes accordingly defined are provided. Similarly, elongated opening 36 defined as illustrated in right outer piston 22 provides an exhaust function which communicates in turn with exhaust port 35 connected to exhaust opening similar to that of intake opening 30 but positioned at the bottom of inner piston 26 rather than the top to provide appropriate timing. Similarly, inner piston 26 is provided, for example, with inlet opening 40 communicating with inlet port 41. Inlet port 41 merely opens at inner piston 26 since there is a static relationship while elongated openings 33 and 36 comprising inlet and exhaust openings respectively of right outer piston 22 are elongated since outer pistons 22 move relative to, for instance, inlet port 32 and exhaust port 35. Each of the two outer pistons 22 and inner piston 26 have an inlet and outlet opening and porting relationship. For instance, inlet opening 46 communicates with left outer piston 22 in a manner identical to that described with reference to inlet opening 30, while inlet opening 47 communicates with bottom inner piston 26 as described above with reference to inlet opening 40 relative to upper inner piston 26.

Piston assembly 20 includes an opening 50 defined centrally through and journaled to receive crank shaft 52, and particularly crank shaft eccentrics 54 at either end of inner pistons 26. Connector 55 serves to secure outer pistons 22 by means of fasteners 56 attached through each of outer pistons 22.

Identical inlet end plate 60 and outlet end plate 62 are adapted to fit tightly to central housing 12. Thus, when assembled, plates 60 and 62 fully enclose piston assembly 20 and provide side surfaces for the four pistons to bear upon and seal in conjunction with top and bottom wall 16 and end wall 14. Inlet end plate 60 includes an inlet pipe 65 while outlet plate 62 contains an identical outlet pipe 66. Though inlet pipe 65 and outlet pipe 66 are shown as facing an opposite direction, it is to be understood that with a very minor design change the otherwise identical end plates 60 and 62 could be arranged in mirror image fashion. Studs 68 are positioned in the corresponding portions of each of inlet plate 60 and outlet plate 66 at the portions including inlet pipe 65 and outlet pipe 66 respectively. In actual assembly, cross bolts and nuts (not shown) fit through openings 70 defined in end plates 60 and 62 and through opening 17 defined through central housing 12 such as to securely attach end plates 60 and 62 to central housing 12.

End journals 72 of crank shaft 52 are accommodated in bearings 75 shown in outlet end plate 62 but similarly provided in inlet end plate 60. Static openings 80, shown in outlet end plate 62 but again similarly located in inlet plate 60 are defined and communicate with outlet pipe 66 as shown, and with inlet pipe 65, such that the inlet and outlet ports defined in piston assembly 20 align with and move past static opening 80 to provide the valving action as will be described in more detail below.

Spring 82 between port blocks 84 serves to bias each port block 84 against adjacent end plate 60 and 62. Thus wear therebetween will be accommodated.

From the above description of pump 10 shown in FIG. 1, it will be apparent that, when assembled, outer pistons 24 will reciprocate laterally in the internal opening of central housing 12 as crank shaft 52 is rotated. Concurrently, inner pistons 26 will reciprocate vertically upon the inner surfaces 28 of the outer pistons 22 thus providing for, effectively, a four piston and four variable volume design. Further, the portion of inner pistons 26 in which the inlet and outlet openings 30, 40, 46 and 47, as well as the opposed exhaust openings (not shown) are defined will be driven by crank shaft 52 in a nutation movement, i.e., with each point on such side plates describing a circle of nutation but being confined from actually rotating. Accordingly, as crank shaft 52 rotates, and outer pistons 22 and inner pistons 26 reciprocate as described, the inlet and outlet openings will come into communication and be sealed from static opening 80 providing the nutating valving function. It is to be understood that such valving function though illustrated with reference to the pump structure of FIG. 1, can be generally applied and require only the elements illustrated in FIG. 2.

Accordingly, the structure of FIG. 1 is not to be viewed in any way as a particular structure necessary to the nutating valving, but only as a pump structure 10 illustrating advantages with regard to simplicity and compactness. In actuality, the nutating valving arrangement may be utilized in conjunction with conventional reciprocating engines, with rotary engines or in any environment in which a timed valving function is desired.

Turning now to FIG. 2, nutating valving structure 85 is illustrated in which a nominally static plate 87 is illustrated having a static opening 88 defined therethrough while nutating plate 90 includes a nutating opening 91 defined therethrough. Each point on nutating plate 90 moves through circle of nutation 94 illustrated with reference to the end portions of nutating opening 91. Such movement minimizes the relative travel of the moving portion of the valving structure relative to the static structure, thereby permitting a longlasting sealing relationship therebetween. As is apparent, as nutating opening 91 aligns with static opening 88, flow therethrough may occur. As illustrated in FIG. 2, openings 88 and 91 are offset thus sealing against flow.

The operation and timing of various embodiments of valving structure 85 will be discussed with reference to FIGS. 3A through 3H, FIGS. 4A through 4F, FIGS. 5A through 5F (in which the structural components will be identified with reference to FIG. 2), FIG. 6 and FIGS. 7A through 7F.

Turning now to FIGS. 3A through 3H, a simplified version of the structure illustrated in FIG. 2 is illustrated with regard to static opening 88, nutating opening 91 and circles of nutation 94. Though not illustrated, it is to be understood that the basic relationship is as shown in FIG. 2 and relates to omitted structure such as static plate 87 and nutating plate 90.

Figures 3A, 3B, 3C, 3D, 3E, 3F, 3G, 3H:
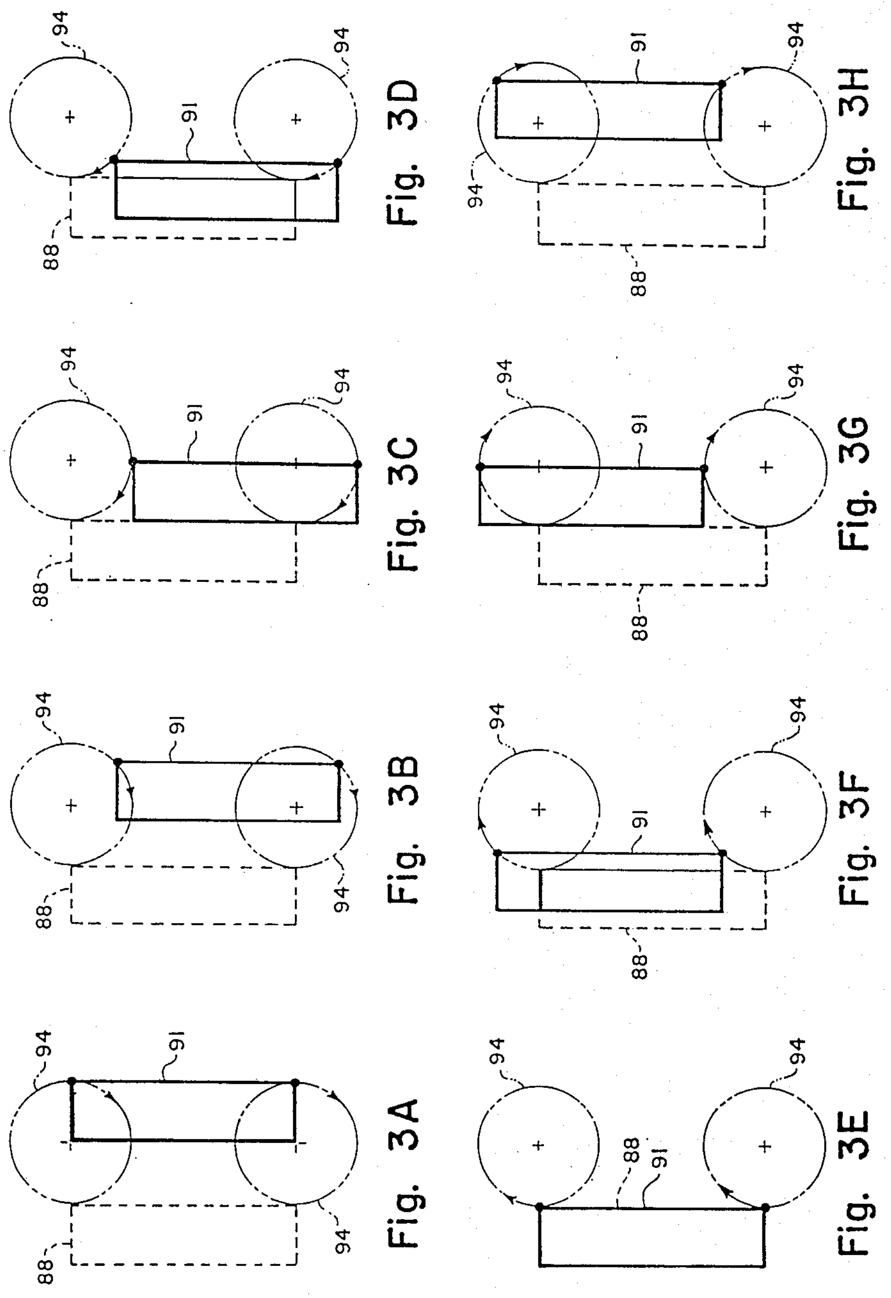
FIGS. 3A through 3H illustrate a timing relationship and geometry of a nutation valving structure which opens and closes at bottom dead center and top dead center, respectively.

As shown in FIGS. 3A through 3H, a symmetrically timed, i.e. open for 180° and closed for 180° valving structure essentially identical to valving structure 85 of FIG. 2 is illustrated in a schematic, operational arrangement. Static opening 88 is illustrated as being of a dimension equal to that of nutating opening 91 and both are parallel to lines connecting the centers of circles of nutation 94. As shown in FIG. 3A, nutating opening 91 is in a sealed, closed relationship with regard to static opening 88 and maintains such "closed" relationship through the orientation shown in FIG. 3H depicting nutating opening 91 moving in a clockwise relationship towards static opening 88. At the 180° mark of circles of nutation 94 as shown in FIG. 3C, nutating opening 91 is reaching incipient overlap with static opening 88. As nutating opening 91 moves past the bottom dead center position of circles of nutation 94, alignment of opening 88 and 91 occurs thus permitting flow. At the 270° mark, as shown in FIG. 3E, full opening resulting in complete overlap of openings 88 and 91 occurs. Thereafter, closing is initiated, as shown in FIG. 3F, as nutating opening 91 moves toward the top dead center position vis-a-vis circles of nutation 94. Thereafter, at the top dead center or 0° mark, closing is accomplished as nutating opening 91 moves away from overlap with static opening 88. Thereafter, as shown in FIG. 3H, nutating opening 91 moves towards the position shown in FIG. 3A to repeat the cycle. Thus, in a full cycle the valving structure is closed for 180° of travel and open for 180° of travel with complete opening occurring at the 270° position as shown in FIG. 3E. The incremental opening and closing reduces turbulence and noise associated with valve operation and particularly when used with the port configuration more fully set forth below.

Figures 4A, 4B, 4C, 4D, 4E, 4F:
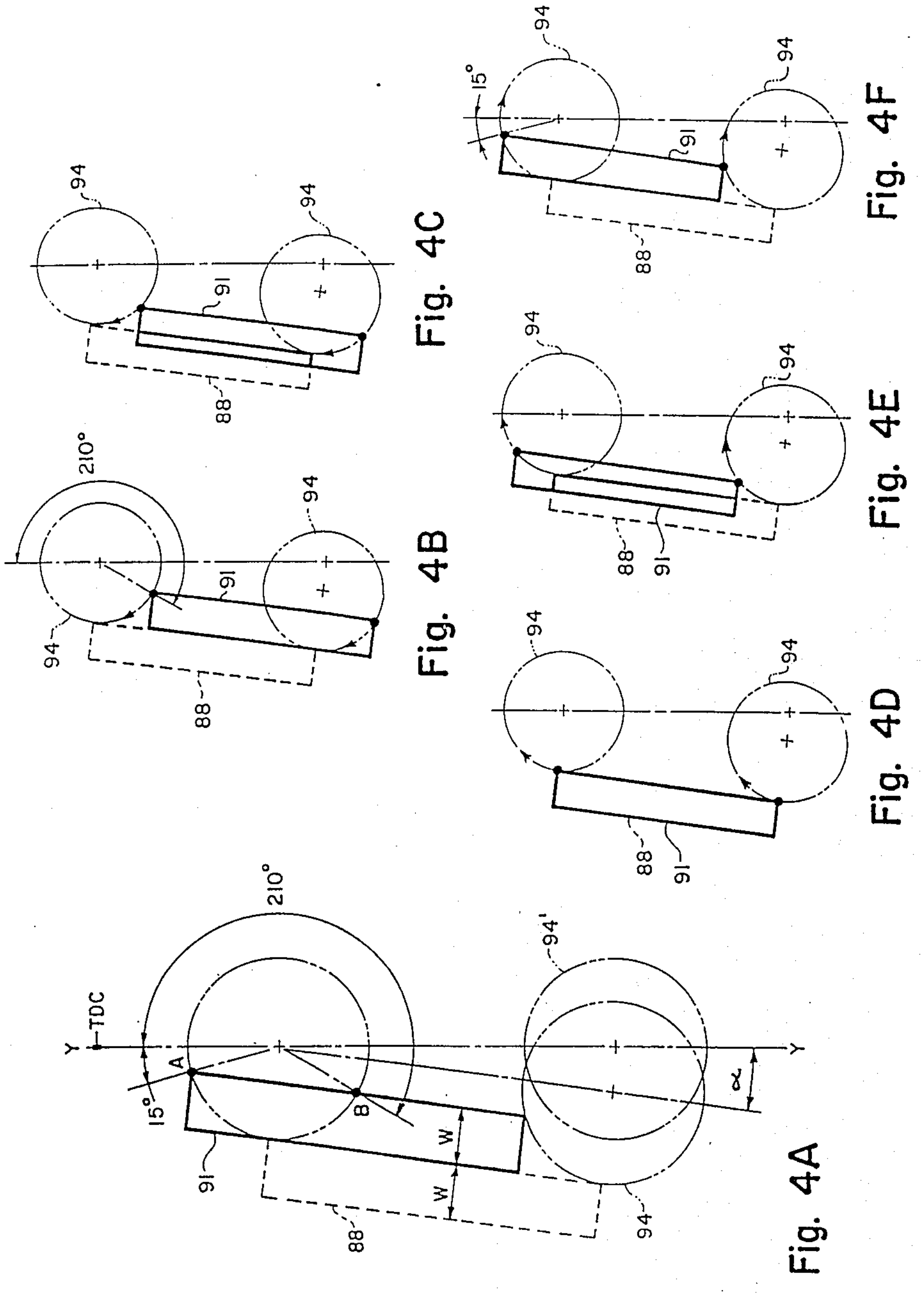
FIGS. 4A through 4F illustrate a timing and design relationship of a nutating valving structure in which the valve is opened for a short duration of a full cycle.

A method of designing and developing timing relationship is illustrated in FIGS. 4A through 4F wherein the static opening 88 and nutating opening 91 are again of similar size, configuration and dimensions. It is to be understood that the shape of such openings is yet another variable useful for providing, for instance, greater overlap at full openings, accelerated rates of opening, etc. but for purposes of illustration these parameters are held constant. With reference to FIG. 4A, it will be noted that points A and B, the closing and opening points respectively of the desired timing configuration are plotted. Point A is 15° before top dead center while point B is 30° past bottom dead center. The right edge of nutating opening 91 is then aligned as shown through such points. It is to be understood of course that similar circles of nutation 94 exist for all points on nutating opening 91 and that other edges may be readily used for any construction as will be apparent to those skilled in the art. Static opening 88 is then positioned in the closed position, i.e. overlap of the leading edge of static opening 88 and the trailing edge of nutating opening 91. For purposes of illustration, it will be noted that circle of nutation 94, which would constitute the 180° timing illustrated with reference to FIGS. 3A through 3H, is spaced from lower circle of nutation 94′ developed by the construction with the angle $\alpha$ therebetween being the angle through which the orientation of the openings 88 and 91 are rotated from the above discussed symmetrical timing arrangement.

In operation, as shown in FIG. 4B, opening of the valving device occurs at 210° past top dead center as the openings 88 and 91 align in an incipient overlap position. Thus, as shown in FIG. 4C, when nutating opening 91 moves into the overlap position with static opening 88, flow is permitted. Complete opening occurs as shown in FIG. 4D with overlap of static opening 88 and nutating opening 91. In a manner similar to that discussed with reference to FIGS. 3A through 3H, nutating opening 91 moves towards the closed position, as shown in FIG. 4E until closing is completed as shown in FIG. 4F at 15° before top dead center, i.e. the selected design point. It is to be understood that the width W of nutating opening 91 is determined by positioning the left edge thereof tangent to upper circle of nutation 94 in the manner shown. Accordingly, the widths W of openings 88 and 91, which are by definition equal, differ for a fixed circle of nutation from that of symmetrically timed device shown in FIGS. 5A through 3H.

Figures 5A, 5B, 5C, 5D, 5E, 5F:
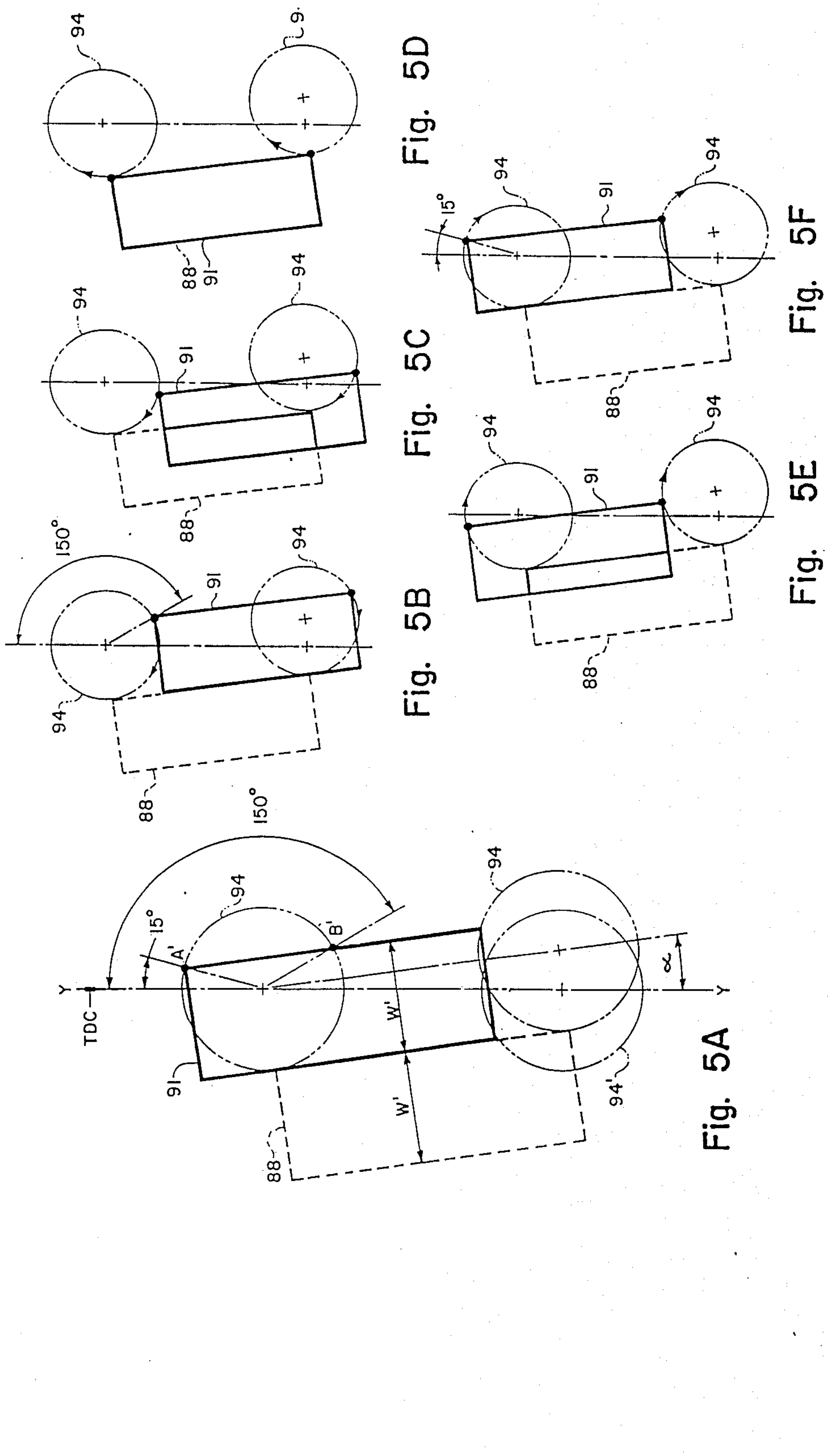
FIGS. 5A through 5F illustrate an arrangement similar to that of FIGS. 4A through 4F with a long duration design.

In the event a long duration valving device is desired, a similar construction may be accomplished as shown in FIGS. 5A through 5F. With reference to 5A, it will be noted that point A′, i.e. the closing point with reference to a clockwise rotating device, is constructed on upper circle of nutation 94 while point B, the closing point is constructed on circle of nutation 94 at the selected closing and opening points, i.e. 15° past top dead center and 150° past top dead center respectively. Nutating opening 1 again is of a width W′, this time a larger relative dimension, such that the right edge thereof passes through points A′ and B′ while the left edge is tangent to upper circle of nutation 94. As shown in FIG. 4A, but discussed in more detail here, static opening 88 is positioned with a width and length identical of that of nutating opening 91, with the right edge thereof aligned with the left edge of nutating opening 91 as shown in FIG. 5A, and with the upper surface of upper edge of static opening 88 positioned at the tangent point of the left edge of nutating opening 91 to upper circle of nutation 94. Accordingly, the desired timing may be accomplished and the location of openings 88 and 91 precisely determined using essentially identical procedures in FIGS. 4A and 5A. However, as will be noted, this time lower circle of nutation 94 is offset to the right from circle of nutation 94', which would constitute a symmetrical timing arrangement as shown in FIG. 3A. It should be noted that width W' of openings 88 and 91 is relatively larger in the long duration device illustrated in FIG. 5A. In operation, as shown in FIG. 5B, nutating opening 91 is at the incipient opening position, i.e. 150° past top dead center of circle of nutation 94. Upon further rotation as shown in FIG. 5C, overlap of nutating opening 91 and static opening 88 occurs thereby permitting flow. Full opening is accomplished, as shown in FIG. 5D, at the position, with reference to FIG. 5A, in which the left edge of nutating opening 91 is tangent to upper circle of nutation 94 at the closed position.

Again in a manner discussed similar to that discussed above, nutating opening 91 moves past the full opening position, as shown in FIG. 5E to the closed position as shown in FIG. 5F, i.e. at 15° beyond top dead center. It should be recognized that in the arrangement shown in FIGS. 5A through 5F, which is specified according to the construction shown in FIG. 5A, the device would be closed for 150° of rotation relative to circle of nutation 94 while being opened for 210° of such rotation.

Figure 6:
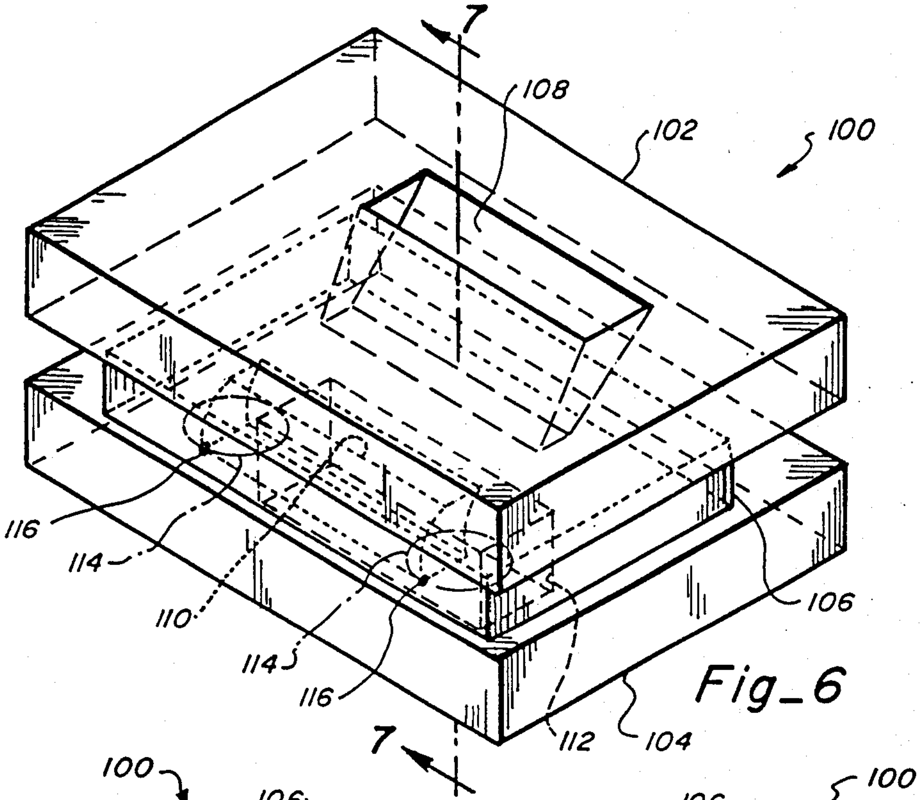
FIG. 6 is a simplified perspective view of a nutating and static plate arrangement illustrating the advantageous port configuration and nutation motion giving rise to the advantageous valving structure of the instant invention.

Turning now to FIG. 6, a nutating valving structure 100 is illustrated including nominally static plates 102 and 104 and nutating plate 106. While two static plates are shown and described herein, it is to be realized, however, that only one static plate and one nutating plate are necessary according to this invention.

Static plate 102 includes static opening 108 defined therethrough while nutating plate 106 has nutating opening 110 defined therethrough. Static plate 104 includes static opening 112 therethrough, with opening 112 being larger along one dimension thereof than nutating opening 110, as is more clearly shown in FIGS. 7A through 7F. As described hereinabove, each point on nutating plate 106 moves through circle of nutation 114 illustrated with reference to end portions 116 of nutating opening 110.

Figure 7A:
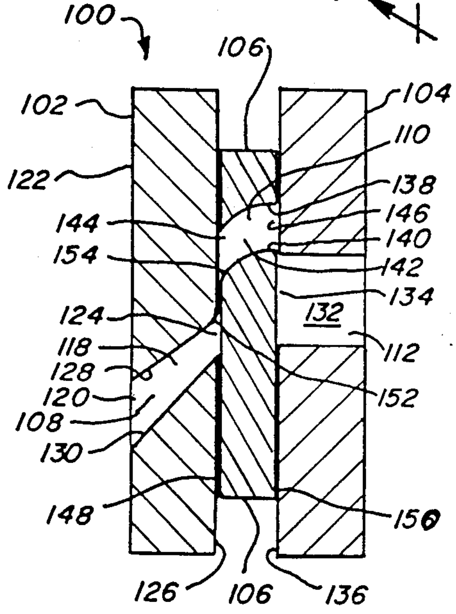
FIGS. 7A through 7F are cross sectional views of the nutating and static plates shown in FIG. 6 taken along section line 7—7 illustrating the advantages of the flow conditioned port configuration and disposition in a valving cycle of the instant invention.

The operation and port configuration of valving structure 100 will be discussed with reference to FIGS. 7A through 7F. In FIG. 7A, static opening 108 is shown to include intake channel 118 having port 120 in outer face 122 of nominally static plate 102, and port 124 in inner face 126 of static plate 102. Channel wall portions 128 and 130 converge between ports 120 and 124, with port 124 being smaller in cross-section than is port 120.

Static opening 112 in static plate 104 includes exhaust channel 132 having a port 134 at inner face 136 of static plate 104, with channel 132 being larger in cross-section than is nutating opening 110 through nutating plate 106. Nutating opening 110 is shown to include curved side wall portions 138 and 140 forming channel 142 having ports 144 and 146 in faces 148 and 150 of nutating plate 106, respectively. Ports 144 and 146 are substantially equal in cross-section with respect to one another and with respect to port 124 of static plate 102. Rounded edge 152, at the terminus of wall portion 128 of channel 118 at port 124, and rounded edge 154, at the terminus of wall portion 140 of channel 142 at port 144, are provided in static plate 102 and nutating plate 106, respectively.

Figure 7B:
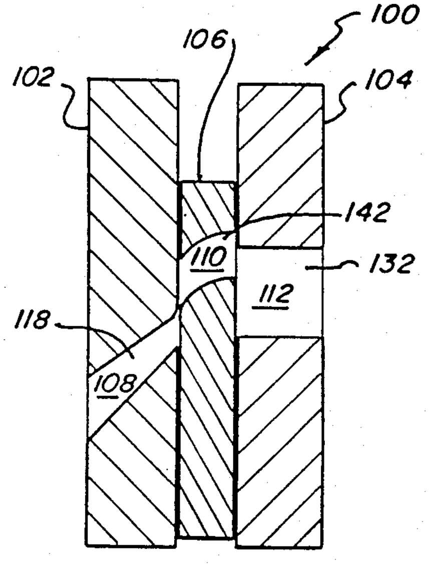
Figure 7C:
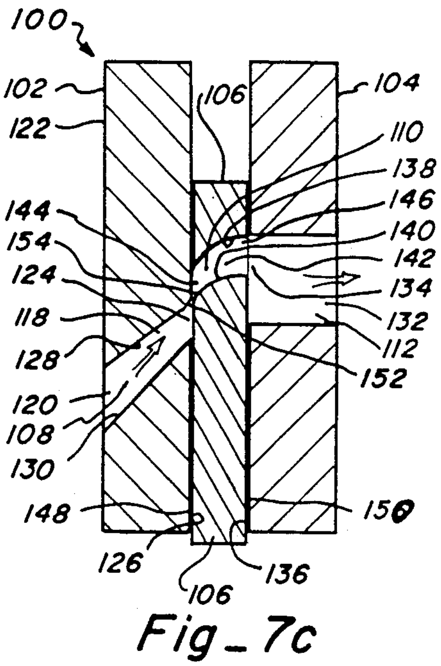

FIG. 7A presents valving structure 100 in its fully closed position with ports 124 and 144 in a spaced, non-overlapping position, and ports 134 and 146 also in a spaced position. In FIG. 7B, nutation motion has brought nutating plate 106 into a position wherein the ports are nearing an overlap condition which will allow opening of the valve for flow through channel 118. FIG. 7C shows valving structure 100 at commencement of valve opening to place channels 118 and 142 in communication with one another through the partial overlapping of ports 124 and 144 (port 146 is fully opened to channel 132 through port 134 at this time).

As may be appreciated, flow conditioning is provided by converging side wall portions 128 and 130 which serve to provide a turbulence reducing, gradual flow velocity transition as flow approaches the small opening provided by the partially overlapping ports. The particular angular orientation of side wall portion 130 to face 148 of nutating plate 106 also serves to redirect flow without creating reflecting waves (which would be present were side wall portions 128 and 130 perpendicular to face 148) thereby further reducing turbulent flow and noise levels of valving structure 100, as well as reducing the shock on the structure (especially during opening and closing). Rounded edges 152 and 154 serve a similar function by smoothly directing flow to channel 142 and curved side wall portion 140.

Curved side wall portions 138 and 140 again smoothly redirect flow resulting in less turbulence at port 134 of exhaust channel 132. The perpendicular disposition of channel 142 at inner wall 136 of static plate 104 together with the larger port 134 also reduces turbulent flow into channel 132 (sometimes referred to as the Kamm effect).

Figure 7D:
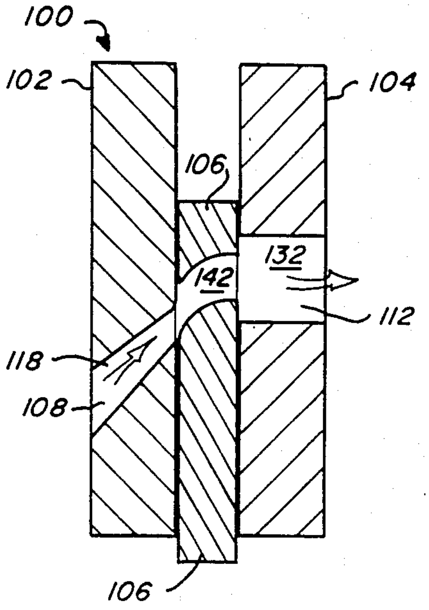
Figure 7E:
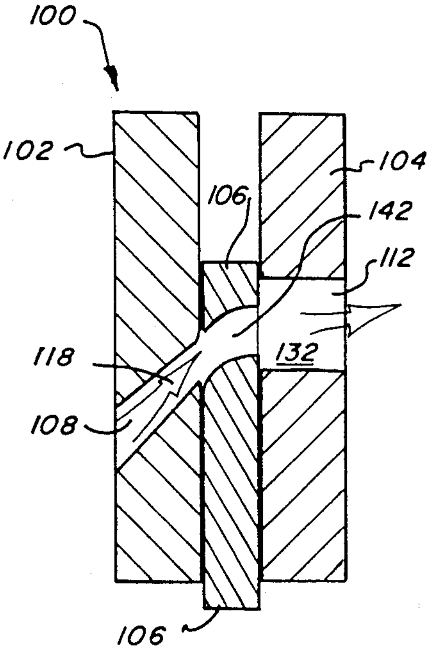
Figure 7F:
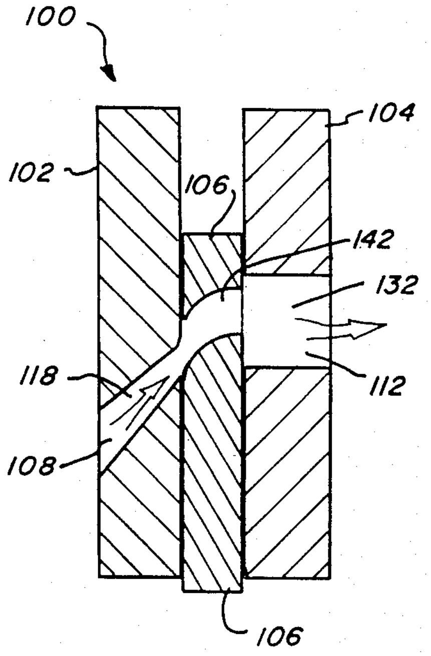

In FIG. 7D valving structure 100 is shown in a partially open position. The flow characteristics discussed with regard to FIG. 7C have been maintained at both the intake channel 118 and exhaust channel 132 as can also be seen to be the case in FIG. 7E when valving structure 100 is fully opened and FIG. 7F where the nutation motion has brought valving structure 100 again toward a closed position.

In summary, it will be recognized that the nutation valving arrangement of the present invention involves at least two plates (and often conveniently three plates) at least one of which has defined therethrough an opening that nutates relative to the remaining plate. Various timing, rate of opening and other parameters may be conveniently designed into the arrangement, with such parameters being essentially independent of piston timing or position. A nutating opening is caused to overlap and then move away from a static opening thereby providing a valving arrangement having low relative velocity and movement between the plates containing the openings. The ports are flow conditioned to accommodate more efficient flow characteristics by reducing turbulence and noise, mitigating reflected waves associated with sudden opening and closing of valves, and providing for smooth flow velocity transitions when openings are minimally overlapping. Conveniently, the plates may be biased towards one another thereby taking up wear between the plates and maintaining an extremely long lasting and effective sealing relationship. Though of particular advantage with reference to devices having intrinsically nutating surfaces, such as the pump described above, it is to be understood that the plates could be driven through the nutating relationship to provide, for instance, valving for normal reciprocating pistons. Such valving can readily be provided for four stroke designs.

Though only limited embodiments and examples of the instant invention and method of operation thereof had been specifically illustrated and described in order to provide preferred illustrations, it is to be understood that the invention involves structures and procedures as will be apparent to those skilled in the art and limited only by the following claims.

What is claimed is:

1. A nutation valving apparatus comprising:

at least one fixed plate having first and second faces and at least one channel extending between an opening defined in each said face with said opening in at least said first face having leading and trailing linearly extending edge portions;

at least one nutating plate mounted to nutate around a circle of nutation of a given dimension, said nutating plate having first and second faces and at least one channel extending between an opening defined in each said face with said opening in at least said first face having leading and trailing linearly extending edge portions and with said first face of said fixed and nutating plate being adjacent to one another, said opening defined in said first face of said nutating plate and said opening defined in said first face of said fixed plate being arranged so that the leading and trailing linearly extending edge portions of said opening in said first face of said nutating plate are maintained substantially parallel to said leading and trailing linearly extending edge portions, respectively, of said opening in said first face of said fixed plate during relative movement between said plates to thereby bring said openings into an overlapping relationship during one portion of the nutation movement of the nutating plate and causing said openings to be in a spaced relationship during a different portion of the nutation movement of the nutating plate;

means to drive said nutating plate through a nutating motion causing said openings in said first face of said nutating plate to be moved incrementally between said spaced and overlapping relationships with respect to said openings in said first faces of said fixed plate; and at least one of said channels extending through said fixed and nutating plates being configured to provide flow conditioning therethrough;

whereby valving may be accomplished by selectively configuring said openings in said first faces of said fixed plate and nutating plate to provide for incremental opening of the valving apparatus to permit flow during overlap of said openings in said first faces of said fixed plate and nutating plate and incremental closing of the valving apparatus to preclude flow during periods when said openings in said first faces of said fixed plate and nutating plate are spaced apart in a non-overlapping relationship during the nutation movement, with said configuration of said at least one of said channels substantially reducing valve noise and turbulent flow during said incremental opening and closing of said valving apparatus.

2. The nutating valving apparatus of claim 1 wherein said apparatus includes a second fixed plate having first and second faces with said first face being positioned adjacent to said second face of said nutating plate, said second fixed plate including a channel therethrough extending between an opening in each of said first and second faces, with the opening in said first face being brought into an overlapping relationship with respect to said opening in said second face of said nutating plate during at least a portion of the nutation movement of said nutating plate, during which said first faces of said fixed and nutating plates are in an overlapping relationship, and at least one of said fixed plates and said nutating plate being in a spaced relationship during a different portion of said nutation movement.

3. The nutating valving apparatus of claim 2 wherein said opening in said first face of said second fixed plate and said opening in said second face of said nutating plate have leading and trailing linearly extending edge portions arranged so that said leading and trailing linearly extending edge portions of said openings in said second face of said nutating plate and said first face of said second fixed plate are maintained substantially parallel to one another during relative movement between said nutating plate and said second fixed plate, said opening in said first face of second fixed plate being substantially larger at least between said leading and trailing linearly extending edge portions thereof than said opening in said second face of said nutating plate, and wherein flow is directed through said channel in said one fixed plate and through said channel in said nutating plate, when said openings in said first faces of said fixed plate and nutating plate are in overlapping relationship, to said channel in said second fixed plate, when said openings in said second face of said nutating plate and said first face of said fixed plate are in overlapping relationship, whereby less turbulent flow is achieved between said nutating plate and said second fixed plate.

4. The nutating valving apparatus of claim 1 wherein said apparatus includes a second nutating plate substantially identical to that of said first nutating plate, wherein said nutating plates are driven together, and wherein said openings in all of said plates are aligned with one another at adjacent plate faces during said one portion of said nutation movement of said nutating plates.

5. The nutating valving apparatus of claim 1 wherein said fixed plate and nutating plate are resiliently biased one towards the other, whereby wear between the plates is accommodated and a sealing relationship between the plates maintained.

6. The nutating valving apparatus of claim 1 wherein said openings in said fixed plate and nutating plate are rectilinear in configuration.

7. The nutating valving apparatus of claim 6 wherein said opening in said first face of said fixed plate and the opening in said first face of said nutating plate are of the same shape and size and positioned to fully overlap during at least one position of the nutating movement of the nutating plate.

8. The nutating valving apparatus of claim 1 wherein said openings in said first faces of said fixed plate and nutating plate overlap at least in part for no more than 180° of the nutating motion of the nutating plate.

9. The nutating valving apparatus of claim 1 wherein said openings in said first faces of said fixed plate and nutating plate overlap at least in part for at least 180° of the nutating motion of the nutating plate.

10. The nutating valving apparatus of claim 1 wherein said nutating motion of said nutating plate is in timed relationship to a rotating crank shaft.

11. The nutating valving apparatus of claim 1 wherein said channel in said at least one of said plates configured for flow conditioning includes first wall portions extending through said fixed plate, said edge portions of said openings in said first and second faces forming terminuses for said first wall portions, and said first wall portions extending angularly through said fixed plate and steadily converging so that said opening at said first face is smaller than said opening at said second face, at least one part of said first wall portion and said second face forming an obtuse angle at said leading edge of said opening in said first face of said fixed plate, and said edge portions of said opening in said first face of said nutating plate forming terminuses for second wall portions forming said channel through said nutating plate, whereby said nutation movement causes said leading edge portion of said opening in said first face of said fixed plate to first encounter said trailing edge portion of said opening in said first face of said nutating plate when said openings are being brought into said overlapping relationship.

12. The nutating valving apparatus of claim 11 wherein said second wall portions are substantially parallel to said first wall portions when said second wall portions are near said first face of said nutating plate, and are substantially perpendicular to said second face of said nutating plate when near said edge portions thereof, said second wall portions thereby being curved between said first face and said second face of said nutating plate whereby less turbulent flow is achieved.

13. The nutating valving apparatus of claim 12 wherein one of a combination of said leading linearly extending edge portion of said opening in said first face of said fixed plate and said trailing linearly extending edge portion of said opening in said first face of said nutating plate, and said trailing linearly extending edge portion of said opening in said first face of said fixed plate and said leading linearly extending edge portion of said opening in said first face of said nutating plate are rounded along the entire lengths thereof thereby further reducing turbulent flow during incremental opening and closing of said valving apparatus.

14. A nutation valving apparatus comprising:

at least one fixed plate having first and second faces and at least one channel extending between an opening defined in each said face with said opening in at least said first face having leading and trailing edge portions;

at least one nutating plate mounted to nutate around a circle of nutation of a given dimension, said nutating plate having first and second faces and at least one channel extending between an opening defined in each said face with said opening in at least said first face having leading and trailing edge portions and with said first face of said fixed and nutating plate being adjacent to one another, said opening defined in said first face of said nutating plate and said opening defined in said first face of said fixed plate being arranged so that the leading and trailing edge portions of said opening in said first face of said nutating plate are brought into an overlapping relationship during one portion of the nutation movement of the nutating plate and causing said openings to be in a spaced relationship during a different portion of the nutation movement of the nutating plate;

means to drive said nutating plate through a nutating motion causing said openings in said first face of said nutating plate to be moved incrementally between said spaced and overlapping relationships with respect to said openings in said first face of said fixed plate; and at least one of said channels extending through said fixed and nutating plates being configured to provide flow conditioning therethrough;

whereby valving may be accomplished by selectively configuring said openings in said first faces of said fixed plate and nutating plate to provide for incremental opening of the valving apparatus to permit flow during overlap of said openings in said first faces of said fixed plate and nutating plate and incremental closing of the valving apparatus to preclude flow during periods when said openings in said first faces of said fixed plate and nutating plate are spaced apart in a non-overlapping relationship during the nutation movement, with said configuration of said at least one of said channels substantially reducing valve noise and turbulent flow during said incremental opening and closing of said valving apparatus.

15. A method for operating a nutating valving apparatus including at least one fixed plate having first and second faces and at least one channel extending between an opening defined in each said face with said opening in at least said second face having leading and trailing linearly extending edge portions, and at least one adjacent nutating plate having first and second faces and at least one channel extending between an opening defined in each said face, with said opening in at least said first face of said nutating plate having leading and trailing linearly extending edge portions, the method comprising:

incrementally opening the valving apparatus by moving each point of the nutating plate through a circle of nutation with the leading edge portions of said openings being maintained substantially parallel to one another so that the opening in the first face of the nutating plate incrementally at least partially overlaps the opening defined in the second face of the fixed plate;

flowing a fluid substance through said channels and conditioning the flow to reduce valve noise and turbulence during at least the initial portion of said incremental opening of said valving apparatus; and incrementally closing the valving apparatus by continuing motion of the nutating plate with the trailing edge portions of the openings in the first face of the nutating plate and the second face of the fixed plate being maintained substantially parallel to one another to position the opening in the nutating plate in a spaced, non-overlapping relationship to the opening in the fixed plate, whereby fluid flow is terminated by the sealing relationship of the fixed plate and nutating plate.

16. The method for operating a nutating valving apparatus of claim 15 wherein the step of conditioning said flow includes the step of causing the flow velocity of said fluid substance to be gradually increased in said channel defined in said fixed plate before said fluid substance flows through said overlapped openings and configuring said channel defined in said fixed plate so that said fluid substance flows less turbulently during incremental opening of said valving apparatus.

17. The method of operating a nutating valving apparatus of claim 15 wherein the nutating plate and fixed plate are urged together by biasing means to maintain a sealing relationship between the adjacent faces of the fixed plate and nutating plate.

18. A method for operating a nutating valving apparatus including at least one fixed plate having first and second faces and at least one channel extending between an opening defined in each said face with said opening in at least said second face having leading and trailing edge portions, and at least one adjacent nutating plate having first and second faces and at least one channel extending between an opening defined in each said face, with said opening in at least said first face of said nutating plate having leading and trailing edge portions, the method comprising:

incrementally opening the valving apparatus by moving each point of the nutating plate through a circle of nutation with the leading edge portions of said openings being maintained so that the opening in the first face of the nutating plate incrementally at least partially overlaps the opening defined in the second face of the fixed plate;

flowing a fluid substance through said channels and conditioning the flow to reduce valve noise and turbulence during at least the initial portion of said incremental opening of said valving apparatus; and incrementally closing the valving apparatus by continuing motion of the nutating plate with the trailing edge portions of the openings in the first face of the nutating plate and the second face of the fixed plate being maintained to position the opening in the nutating plate in a spaced, non-overlapping relationship to the opening in the fixed plate, whereby fluid flow is terminated by the sealing relationship of the fixed plate and nutating plate.

19. The method of claim 18 wherein said step of flowing a substance through said channels and conditioning the flow includes conditioning the flow in both of said channels.

* * * * *

UNITED STATES PATENT AND TRADEMARK OFFICE
CERTIFICATE OF CORRECTION

PATENT NO. : 4,672,989

DATED : June 16, 1987

INVENTOR(S) : Milburn, Jr.

It is certified that error appears in the above-identified patent and that said Letters Patent is hereby corrected as shown below:

Column 6, line 54, "5A" should be --3A--.

Column 9, line 49, "faces" should be --face--.

Signed and Sealed this

Third Day of November, 1987

*Attest:*

DONALD J. QUIGG

*Attesting Officer*

*Commissioner of Patents and Trademarks*